(12) United States Patent
Fahrenkopf et al.

(10) Patent No.: US 11,914,350 B2
(45) Date of Patent: Feb. 27, 2024

(54) MANUFACTURING PROCESS CONTROL USING CONSTRAINED REINFORCEMENT MACHINE LEARNING

(71) Applicant: Siemens Aktiengesellschaft, Munich (DE)

(72) Inventors: Max Fahrenkopf, Palo Alto, CA (US); Chengtao Wen, Redwood City, CA (US); Juan L Aparicio Ojea, Moraga, CA (US)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 349 days.

(21) Appl. No.: 17/253,146

(22) PCT Filed: Aug. 9, 2018

(86) PCT No.: PCT/US2018/045902
§ 371 (c)(1),
(2) Date: Dec. 17, 2020

(87) PCT Pub. No.: WO2020/032947
PCT Pub. Date: Feb. 13, 2020

(65) Prior Publication Data
US 2021/0247744 A1      Aug. 12, 2021

(51) Int. Cl.
*G05B 19/418*      (2006.01)
(52) U.S. Cl.
CPC .............. *G05B 19/4188* (2013.01); *G05B 2219/32335* (2013.01); *G05B 2219/40499* (2013.01)

(58) Field of Classification Search
CPC ...... G05B 19/4188; G05B 2219/32335; G05B 2219/40499; G05B 13/0265; G06N 3/006; G06N 3/08; G06N 7/01
See application file for complete search history.

(56) References Cited

U.S. PATENT DOCUMENTS

| | | | |
|---|---|---|---|
| 2017/0228662 A1* | 8/2017 | Gu | G06N 3/042 |
| 2018/0129974 A1* | 5/2018 | Giering | G05B 13/027 |
| 2018/0356793 A1* | 12/2018 | Kanemaru | G06N 3/006 |
| 2019/0302708 A1* | 10/2019 | Iwane | G05B 13/0265 |

FOREIGN PATENT DOCUMENTS

EP      3319016 A1      5/2018

OTHER PUBLICATIONS

Chen Tessler et al., "Reward Constrained Policy Optimization", May 28, 2018, (retrieved from https://arxiv.org/pdf/1805.11074v1.pdf) (Year: 2018).*
P. Geibel et al: Risk-Sensitive Reinforcement Learning Applied to Control under Constraints, Journal of Artificial Intelligence Research, vol. 24, Jan. 1, 2005 (Jan. 1, 2005), pp. 81-108, XP055573201 / Jan. 1, 2005.

(Continued)

*Primary Examiner* — Christopher E. Everett

(57) ABSTRACT

For manufacturing process control, closed-loop control is provided (18) based on a constrained reinforcement learned network (32). The reinforcement is constrained (22) to account for the manufacturing application. The constraints may be for an amount of change, limits, or other factors reflecting capabilities of the controlled device and/or safety.

17 Claims, 2 Drawing Sheets

(56) References Cited

OTHER PUBLICATIONS

Felix Berkenkamp et al: "Safe Model-based Reinforcement Learning with Stability Guarantees", NIPS 2017, May 23, 2017 (May 23, 2017), XP055573225, / May 23, 2017.
International Search Report dated Apr. 18, 2019; International Application No. PCT/US2018/045902; Filing Date: Aug. 9, 2018; 14 pages.

* cited by examiner

MANUFACTURING PROCESS CONTROL USING CONSTRAINED REINFORCEMENT MACHINE LEARNING

BACKGROUND

This application is a national phase filing under 35 U.S.C. § 371 of International Patent Application No. PCT/US2018/045902, filed Aug. 19, 2018, which is incorporated herein by reference in its entirety.

BACKGROUND

The present embodiments relate to control of manufacturing processes in a manufacturing plant. To maximize production and minimize economic loss, manufactures often rely on detailed mathematical models to find the optimal run conditions of the manufacturing process. Typical mathematical models range from empirical models, which are often based on relatively simple mathematical relationships and rely heavily on plant data, to first-principles models, which are based on differential-algebraic equations that rely heavily on physics and domain knowledge. For example, model predictive control uses a model to predict the response of the process to different control moves. Once the closed-form mathematical model is derived, the optimal run conditions may be found in real-time using real-time optimization of the model predictive control.

Several manufacturing processes are subject to complex, nonlinear relationships between input actions and output responses. These complex relationships may be difficult to describe in a closed-form mathematical model. The benefits derived from using closed-loop control are enough to often motivate manufacturing companies to develop these mathematical models despite the complexity. This development task may take months or years of engineering labor.

In one approach, a model free technique is used. Model-free reinforcement learning is a general-purpose machine learning framework, which enables controllers to adaptively learn the knowledge on controlled processes directly from raw sensor inputs without any hand-engineering features or specific domain knowledge. Then reinforcement learning may reduce the engineering cost and time in programming, tuning, prototyping and commission of control algorithms. While reinforcement learning has recently seen gaining popularity in robotics research, the necessary features for application to manufacturing processes are lacking. The controls output by the reinforcement learned policy may result in unsafe or impractical operation in the plant.

SUMMARY

By way of introduction, the preferred embodiments described below include methods, systems, instructions, and computer readable media for manufacturing process control. Closed-loop control is provided based on a constrained reinforcement-learned network. The reinforcement is constrained to account for the manufacturing application. The constraints may be for an amount of change, limits, or other factors reflecting capabilities of the controlled device and/or safety.

In a first aspect, a method is provided for manufacturing process control with a controller. A state of the manufacturing process of a manufacturing plant is determined. A manipulated variable of a controlled device of the manufacturing process is set. The setting is based on an action output by a reinforcement machine-learned network in response to input of the state. The reinforcement machine-learned network incorporates a constraint of the manufacturing process. The manufacturing plant is operated with the manipulated variable of the manufacturing process as set.

In a second aspect, a control system is provided for manufacturing process control. Sensors are configured to sense a state of a manufacturing system. A controller is configured to determine a change in a device from a reinforcement machine-learned action policy based on the state. The reinforcement machine-learned action policy used rewards based in part on a limitation of the device.

In a third aspect, a method is provided for reinforcement learning in a manufacturing system. Closed-loop control of the manufacturing system is machine learned with reinforcement learning, which optimizes a reward or cost function. The optimization of the reinforcement learning is subjected to a constraint of the manufacturing system. A machine-learned network from the machine learning is stored for a control system of the manufacturing system.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Closed-loop control of a manufacturing processes uses constrained reinforcement learning. The constrained reinforcement learning provides automation for manufacturing. An automation tool allows the end-user to deploy constrained reinforcement learning-based closed-loop control in a manufacturing environment. The artificial intelligence nature of reinforcement learning technology stems from the ability of the application to learn the optimal action policy over time from the data itself.

The constrained reinforcement learning includes integrated safe guards for closed-loop control. While most reinforcement learning techniques are built to fully explore the action space, one or more safe guards are incorporated to allow safe and/or capable application in real world automation environments. The safe guards satisfy functional safety and/or device capability requirements in an end-user's manufacturing site.

Any manufacturing process may use a network trained with reinforcement learning having integrated constraints. The manufacturing process creates an object, fluid, or gas from one or more input objects, fluids, and/or gases. For example, the manufacturing process is for assembly of components together, molding, cutting, drilling, or combinations thereof. As another example, the manufacturing process is for chemical processing. As a running example herein, a mixer or mixing tank is controlled to perform mixing of a chemical bath.

In another example, the manufacturing process is for polymer grade transitions. Polymer grade transitions are used in plastics manufacturing processes. The end-user's goal is to minimize the amount of off-spec polymer produced while moving the process from manufacturing one grade to the next. A typical approach for end-users is to develop a detailed non-linear model which is then used online to minimize off-spec production. The development of this non-linear model is time consuming, often taking months to years to develop. For more rapid development, the artificial intelligence is used to learn the optimal control policy while maintaining functional safety requirements. This innovation allows reinforcement learning to be applied in any stage of the manufacturing automation from factory automation test (FAT) to online closed-loop control.

In flexible manufacturing (e.g. mass customization), there may not be months to build a process model. Mass customization allows building a unique product for each customer or allows customers to extensively configure the product to their needs from design phase. The constrained reinforcement learning, by building model by itself, may be particularly helpful to flexible manufacturing. Constrained reinforcement learning may speed up mass customization, because designing control algorithms with minimal human intervention provides an economically viable method to design and commission manufacturing process controllers for rapid adaptation to fast changing customer needs.

Figure 1:
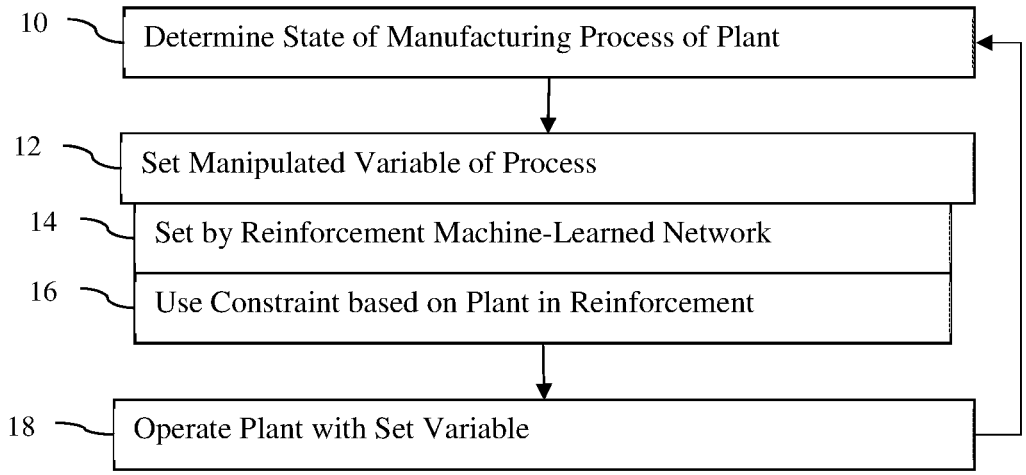
FIG. 1 is a flow chart diagram of an embodiment of a method for application of a reinforcement learned policy in control of a manufacturing process.

FIG. 1 shows one embodiment of a method for manufacturing process control with a controller. Constrained reinforcement learning is applied to closed-loop control of a manufacturing process. Machine learning results in a machine-learned model with a trained artificial agent. For training, many (e.g., hundreds or thousands) samples with known ground truth (e.g., settings) are used. The model is trained to output an act or acts for controlling one or more devices in manufacturing. Once trained, data for a particular state of the manufacturing process is applied to the learned network. A computer control system applies the machine-learned network. The learned network outputs the act or acts (e.g., set points or changes in set points) of one or more devices being manipulated to control the manufacture. The computer control system reads input data, calculates an action policy, and injects the outputs into the plant.

The control occurs at any frequency. Variable or fixed frequencies may be used, such as reading the state, applying the network to calculate an action, and injecting the output action on a fixed scan time frequency. The input data characterizes the state of the manufacturing process at a given time and is used to set one or more variables in the control process for a next time increment, represented by the feedback from act 18 to act 10.

Figure 3:
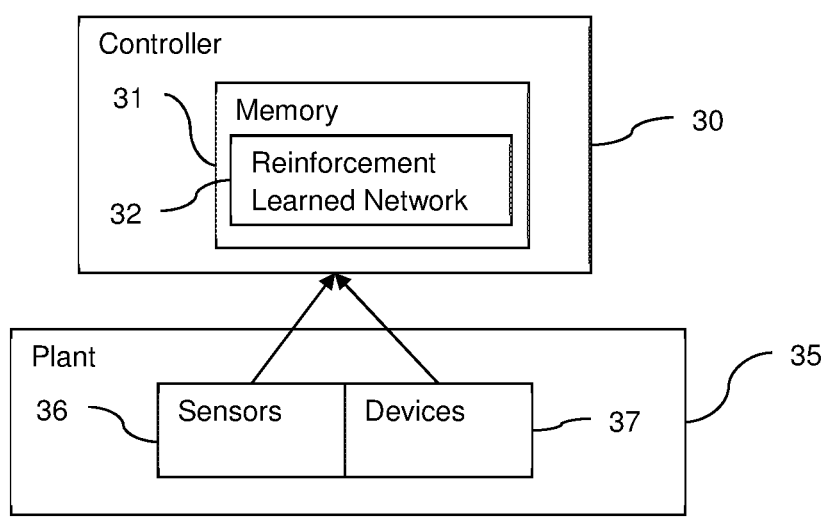
FIG. 3 is a block diagram of one embodiment of a manufacturing system for process control using reinforcement learning.

The method is implemented by the system of FIG. 3 or another system. For example, the method is implemented by a computer, server, other processor, a panel, a programmable logic controller, or another controller and the manufacturing plant. For machine training, a computer, workstation, or server receives data representing a state of the manufacturing system and trains. For application after training, the same or different processor receives data representing the state of the manufacturing system and determines an action based on application of the machine-learned policy. A controller may be used to learn and/or apply.

Additional, different, or fewer acts may be provided. For example, act 16 is combined with or part of act 14. As another example, acts for input or adjustment by a processor or person to alter the manufacturing process are provided. The acts are performed in the order shown (e.g., top to bottom or numerical) or other orders.

In act 10, the controller determines a state of the manufacturing process of a manufacturing plant. The manufacturing plant includes one or more devices subject to computerized control. For example, a mixer includes a motor to set the rate of mixing. A control signal controls the motor to provide the rate of mixing. Any given controlled device may have one or more inputs for control. A same control may control more than one device. Multiple devices may be controlled together or in sequence to provide a desired result.

The manufacturing plant may include various separately controlled devices or groups of devices. Alternatively, multiple devices or groups of devices are controlled to complete manufacture.

The state of the manufacturing process in indicated by the current control signal to the controlled devices (e.g., signal to control mixer speed), desired set points (e.g., mixing rate), and/or sensed information. One or more sensors may provide duplicative measures of the input and/or output for a device and/or measure separate information used in control. For example, temperature and/or humidity sensors are used for control of the mixer so that the control signal to the mixer motor accounts for effects of temperature and/or humidity in providing the desired mix rate and/or to set the mix rate as appropriate for the environment.

The devices of the manufacturing plant are controlled by manipulated variables. The manipulated variables are a set of variables that may be altered in a manufacturing plant. Manipulated variables are typically associated with a control element such as valve, servo, motor, actuator, or mixer. Manipulated variables may also be set-points to other controllers, which are used to drive these final control elements. In the mixer example, the input signal to the motor is the manipulated variable.

The manipulated variables are each independently controlled, so each may be changed without changing another manipulated variable. Alternatively, two or more manipulated variables are to be changed together or otherwise depend on each other. The manipulated variables are represented by zero-order hold functions that hold constant value over some defined length of time, such as one scan time or at the frequency of control. Other functions, such as values that alter over time during the scan time, may be used.

The devices are used to control manufacture, such as providing the mixing rate. The controlled variables are a set of variables that change in response to the changes in the manipulated variables. The goal of the closed-loop controller is to drive the controlled variables to a specific steady-state or reference trajectory over time. The set point, whether fixed or variable over time, is controlled as a control variable based on input of the manipulated variable to the device.

The state of the manufacturing process for a given scan time is indicated by a current value or values of the manipulated variable or variables, a set point or points for a controlled variable or variables responsive to the current values of the manipulated variables, a current value of the controlled variable, and/or any information from sensors.

The state is determined by communication of readings, looking up from a look-up table, access to output control signals, or other sources.

In act 12, a controller sets a manipulated variable of a controlled device of the manufacturing process. More than one variable per device may be set. The variables of multiple devices may be set. The setting is of a value or control signal for controlling operation of the device or devices of the plant. One or more manipulated variables are set.

The setting is in response to a change in state, lack of change in state, the determination of state, and/or a change in a value of a controlled variable. For example, the controller determines that the mixer set point is to be at a greater rate. The control signal or set point for the motor of the mixer is changed. This change or an absolute value based on the change is the value that is set.

The controller is a processor local to the manufacturing plant and/or device being controlled. Any computer control system may be used. For example, the controller is a computer control system that may read and store measurements from an instrument and write values to an actuator. Such computer control systems may have limited computational resources. In other embodiments, the controller is a separate computer (e.g., workstation, control terminal, or server). The separate computer connects to the local controller and/or device (e.g., mixer) using wired or wireless communications, such as using a real-time connectivity framework (e.g., unified architecture (OPC-UA)).

The controller sets the value of the manipulated variable using reinforcement learning. A previously machine-learned model uses the state as an input to determine the setting. The loaded or accessed state information is processed by a machine, such as the controller. The machine uses the state as an input feature vector and inputs the feature vector to the machine-learned model, resulting in the machine-learned model outputting the setting. Alternatively, the reinforcement learning is online or real-time with operation of the plant, so the on-going learning is used to determine the setting. A feed-forward network is used in a convex optimization for online determination.

The trained model is stored in a memory. The trained artificial intelligence (i.e., machine-learned model) is stored. The result of the training is a policy represented by a look-up table or matrix for a neural network. The policy represents the learned knowledge through machine training. Other machine-learned model representations may be used, such as a hierarchy of matrices, weights/connections/convolution kernels, or other non-linear models.

Any memory may be used. The memory used for the training data may be used. For application, the memory may be in other devices. For example, the trained model is stored in a memory of a server. The server uses the trained model to output settings to devices or control systems for devices. As another example, multiple copies of the trained model are provided to control systems and/or manufacturing plants.

Acts 14 and 16 represent different aspects in applying the machine-learned model. Additional, different, or fewer aspects may be provided. The model was trained by reinforcement learning to set value of a manipulated variable in act 14. One or more constraints based on the plant are used in the reinforcement in act 16. The machine-learned model is learned using deep learning (e.g., neural network), so extracts deep learned features. The training learns filter kernels, policy, and/or other information are used to set. This training may be based on learned information extracted from the input data. By applying the deep-learned model, features are extracted from the state information.

For reinforcement learning, a reward system is used to learn how to control the manufacturing process through a series of actions. The training learns a policy indicating how to change one or more variables at a given time and/or through a sequence. Reinforcement learning learns the optimal or a variety of actions for setting. Machine learning techniques are used to automatically identify the best or other options for how to set values of variables among the available alternatives. The reinforcement learning learns a "policy" (e.g., a guideline of how to optimize the setting). Because different actions may be used (e.g., what variable to alter, by how much to alter, absolute value for the variable, sequence of changes, which convolution filters to use at which state, and/or another action), the setting may be encoded as a Markov decision process. An optimal policy may be computed from the Markov decision process using, for example, dynamic programming or more advanced reinforcement learning techniques such as Q-Learning. During the learning procedure, an agent repeatedly tries different actions from the set of available actions to gain experience, which is used to learn an optimal policy responsive to the state at any given scan time and/or previous states. A policy determines for any possible state during the decision process the best action to perform to maximize future rewards. The rewards are set up in a way such that positive rewards are given for actions that lead to fast and reliable (low uncertainty) setting, while negative rewards are given for experiments which provide little or no value to the decision-making process (e.g., in the manufacturing process). Only positive or only negative rewards may be used in other embodiments. Cost and reward are used interchangeably. Experience from past decision-making processes may be used to define the rewards and the states, and settings for past operation of the plant may be used to learn the set of actions.

Any reward (or cost) may be used for training, such as a measure of difference from ground truth or Dice coefficient. In the reinforcement training, the intelligent agent learns which actions (e.g., which settings to change and by how much) given the current state based on the reward. The resulting change or action is rewarded or not, so the training determines the actions for a given situation that provide the greatest reward and/or minimize penalty. The path of action to control the manufacturing process over time in a stable manner is learned. For application, this learned policy is applied without measuring reward.

For training, the training data includes many samples. The samples are states with known operation as the ground truth. In alternative or additional embodiments, the samples include actions taken to operate as the ground truth. The deep learning learns features to be extracted from the state information. These learned features are to be used by the learned policy. The features that may be used to best or sufficiently distinguish between actions are learned from the training data. For example, deep learning (e.g., deep structured learning, hierarchical learning, or deep machine learning) models high-level abstractions in data by using multiple processing layers with structures composed of multiple non-linear transformations, where the input data features are not engineered explicitly. A deep neural network processes the input via multiple layers of feature extraction to produce features used to set. The deep learning provides the features used to set. Other deep learned models may be trained and applied. The machine training is unsupervised in learning the features to use and how to classify given an input sample (i.e., feature vector).

For training, deep Q-learning combines the advantages of automatic feature extraction with effective finite-horizon policy learning. The action space may be proportional to the setting or state space, so there are many options from which to learn the optimal policy. Q-learning may be less effective with hundreds or more optional actions for refinement or evolution. In one alternative, action embedding in combination with policy gradient is used to exploit the intrinsically sparse structure of the relevant action space. In another embodiment, natural evolution strategies (NES) performs the policy exploration in parameter space as part of the learning. NES is particularly suited given the compact parametrization of fully-convolutional networks. Other approaches for deep reinforcement learning may be used.

Figure 2:
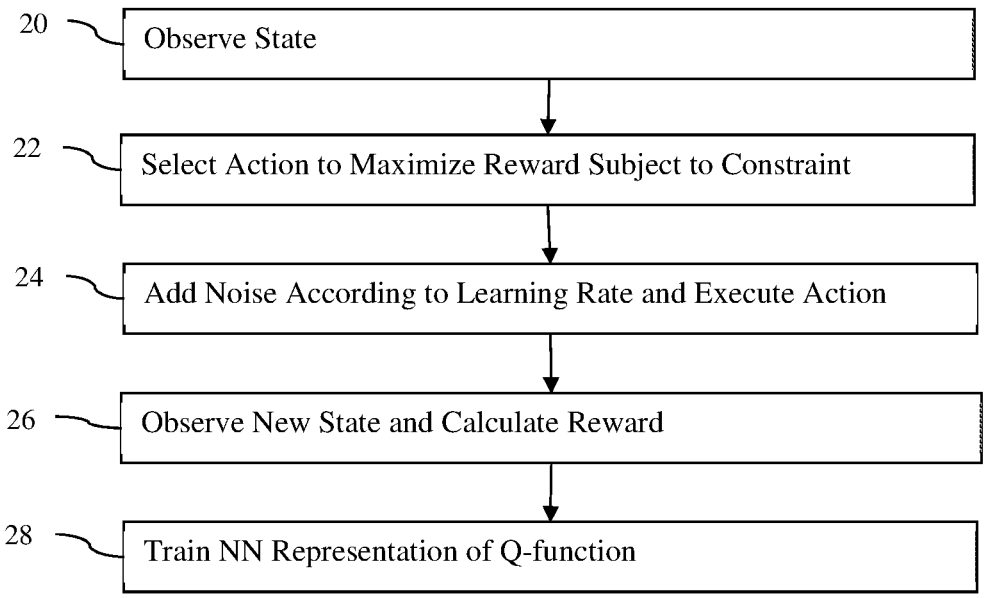
FIG. 2 is a flow chart diagram of one embodiment of a method for reinforcement learning in a manufacturing system.

FIG. 2 shows one embodiment of a method for reinforcement learning in a manufacturing system. The learning is performed during manufacturing by the control system or is performed off-line using state information from previous manufacturing. FIG. 2 is one example approach, but other approaches may be used for reinforcement learning.

In act 20, the state is observed. In act 22, an action is selected to maximize a reward and/or minimize a cost. The reward is subject to a constraint. The constraint is selected based on operational limitations and/or safety in the manufacturing process and/or plant. The action may be randomly selected or may be selected based on actual operation. In act 24, noise is added to the selected action. The noise may be modeled in various ways, such as randomly and/or following a distribution (e.g., randomly selected action weighted by a Gaussian distribution). The noise is added according to the learning rate. The action with the added noise (e.g., selected action altered by an amount based on noise) is executed. The execution may be for actual operation of the plant based on the noise adjusted action as the setting and/or by look-up of previous operation of the plant for the same or similar setting as the noise adjusted action. In act 26, the new state of the manufacturing process and/or plant is observed. The reward, based on one or more constraints, is calculated. Alternatively, the constraints are applied to limit the selection of act 22 and/or the noise adjustment of act 24. In act 28, the neural network or other representation of the Q-function, NES, or other strategy is trained based on the reward, state, and applied action.

In one embodiment, reinforcement learning as part of machine learning is used for closed-loop control of a manufacturing system (e.g., processor and/or plant). The reinforcement learning optimizes a reward or cost function.

Q-learning or a variation of Q-learning is used in one embodiment. In Q-learning, an action policy is chosen from a discrete set of moves with the goal of learning the optimal action policy to maximize the reward given the current state of the system with or without past state information. Q-learning is an iterative approach to learning an optimal action policy. The Q-function is defined as the expected discounted reward for executing an action at the states following a policy. At each iteration, (1) the state is observed, (2) an action is taken to partially maximize the expected discounted reward and to partially randomize the search, (3) the next state and the corresponding reward is observed, (4) the Q-function is updated (see FIG. 2).

The optimization of the reinforcement learning is subjected to one or more constraints of the manufacturing system. For safety, an amount of change, maximum value, minimum value, trajectory of change, and/or other limitation on the setting or alteration of the setting is defined. The safety limits may avoid harmful situations or risk, such as fire, toxic chemicals production, device movement when an operator is not in a correct position, or other harmful situation. Similarly, the capabilities of the controlled devices may be limited, which may be defined as a constraint. Limiting based on capability may avoid undue wear, down time for manufacturing, unrealistic setting, and/or harm to equipment.

The constraints are included in the reward structure or function, such as optimizing using a constrained optimization solver. Reinforcement learning utilizes a random search to enable learning new action-policies. The random search, however, introduces uncertainty about the move size. The reward function is modified to include a part of the reward to respond to the constraints. For example, the reward function is modified to suppress large changes in the manipulated variables. The move suppression term in the reward function may be calculated using a norm. For instance, the L2 norm counts as a quadratic penalty for changes in the manipulated variables. Changes above a threshold amount, away from the current value, and/or away from a mean reduce the reward based on the magnitude of the change. Other functions, such as a magnitude-based weight, may be used to increase cost with increasing magnitude of change. As a result, the reward in the learning penalizes large change without excluding large change.

In another embodiment, the constraint is a limit on the amount of change. Rather than penalizing change more greatly for greater amounts, the amount of change is limited to be below a given amount. The reinforcement learning is subjected to a limit on the amount of change. Because reinforcement learning follows a stochastic path toward maximizing the reward function, a move suppression term alone may not be sufficient to limit large moves. Instead, the constraint is a step boundary. A step bound limits the size of the move by some set boundary. For the manipulated variable u at time step k, an example step bound is given as:

$$u_k - u_{k-1} \leq \Delta u_{max}$$

where $\Delta u_{max}$ is a specified step bound. A step bound may be specified for one manipulated variable. In other embodiments, step bounds are specified for each or multiple manipulated variables, in which case $u_k$ and $\Delta u_{max}$ are vectors. The step bound may be defined by the operator, based on device specifications, or by a processor. Step bounds may be defined for controlled variables.

In yet another embodiment, the constraint is an absolute limit on the value of the variable. A maximum, minimum, or both of a manipulated or controlled variable is defined. Absolute limits may be defined in the reward function for any number of variables. The variables are subjected to an absolute limit. The absolute limits may be hard limits for which the inequalities defined as:

$$u_{min} \leq u_k \leq u_{max}$$

$$y_{min} \leq y_k \leq y_{max}$$

are always satisfied. Here, $y_k$ represents a vector of controlled variables at time step k, and $y_{max}$ and $y_{min}$ represent the upper and lower limits, respectively, of the controlled variables. $u_{max}$ and $u_{min}$ represent the upper and lower limits, respectively, of the manipulated variables. In alternative embodiments, soft limits are used. For example, the L2 or other penalty term (e.g., L1) are used to penalize values exceeding the soft limits. The hard and/or soft limits are incorporated into the reward function so that the reinforcement learning is subjected to these constraints.

In a further embodiment, the constraint is a trajectory or change over time. A linear or non-linear trajectory for the setting over time is defined. Deviation from the trajectory is penalized. The penalty may be greater for greater deviation from the trajectory at a given time. The trajectory is defined as a reference trajectory. For example, the reference trajectory is a first order function of the form:

$$r_k = y_\infty + (y_k - y_\infty)e^{-\frac{t_k}{\tau}}$$

where $r_k$ is the reference trajectory at time step k, $y_k$ is the value of the controlled variable at time step k, $y_\infty$ is the desired final value of the controlled variable, and $\tau$ is a user specified or other time constant. The larger the time constant $\tau$, the slower the reference trajectory will approach the target steady state $y_\infty$. The target steady state may be fixed or may be different for different times. Other functions for the trajectory may be used. The reference trajectory may be defined for a manipulated variable.

The reference trajectory may serve multiple functions. The reference trajectory serves as an additional way to limit the change in the manipulated variables. For a sufficiently large time constant $\tau$, a small change in the manipulated variables is all that is needed to ensure the controlled variables track the reference trajectories. Reference trajectories may also be used to facilitate a consistent response in the controlled variables regardless of the current conditions.

The constraint is incorporated into the reward or cost function in any manner. For example, an infinite cost is defined for violation of any hard limit. As another example, a distance or amount of deviation from a soft limit is used to set a cost or reward weight and/or to add or subtract from the reward.

In one example, the constrained optimization solver explicitly solves an optimization problem in order to find the action policy that satisfies the step-bound and/or the hard limit constraints. The action policy is selected to simultaneously maximize the expected discounted reward and to explore the space of possible actions. The action policy may then be selected following a two-stage strategy. First, a constrained optimization problem is solved. In one example embodiment, the constrained optimization problem is given by:

$$\max_{u_k} Q(u_k, y_k)$$

subject to:

$$u_{min} \leq u_k \leq u_{max}$$

$$y_{min} \leq y_k \leq y_{max}$$

$$u_k - u_{k-1} \leq \Delta u_{max}$$

where Q is the reward being maximized in the reinforcement learning. Hard limits on the manipulated and controlled variables and step bounds on the manipulated variables are defined and used in the maximization. Additional, different, or fewer constraints may be incorporated into the optimization, such as including soft bounds, trajectory limiting, and/or suppression of large change.

Unconstrained reinforcement learning will search for an optimal reward via moving to a new policy with a larger reward value. There are no limitations on the values of the policies other than that they maximize the reward. By comparison, constrained reinforcement learning requires maintaining feasibility while achieving convergence behavior to the optimal reward. These constraints make certain polies illegal, which might otherwise be the largest reward (i.e. global optimal). Therefore, the rewards from a constrained optimization solver is smaller than those of an unconstrained solver.

The second stage of the strategy adds some stochastic excitation which may take on the form of a normally distributed random variable $n_k \sim N(0, \sigma)$ such that $u_k \leftarrow u_k + n_k$ where $\sigma$ is a user defined variance of the excitation. This excitation is used to select a next action for then observing the resulting state. The constrained reinforcement learning then uses the action and resulting state information to calculate the reward and learn the policies in the feasible regions defined by the hard and soft constraints.

The Q-function or other policy representation may be represented by a neural network. A convex neural network approximates the Q-function. A Q-function which is convex in $u_k$ may be efficiently maximized using readily available convex constrained optimization solvers. A numerical optimization solver may be used for the non-convex case. Other reward functions than a Q-function may be used, such as NES.

The optimization may result in actions at their maximum or minimum. This may limit ability to control the manufacturing effectively. In one embodiment, the active constraints in the solver are identified by non-zero Lagrange multipliers. A constraint is considered active if the variable is at its high or low limit. If the problem is well scaled, then the Lagrange multipliers give indication of the cost of the constraint being active on the objective function. The Lagrange multiplier shows how much better the objective value would be if the constraint was removed. The optimization may be performed again with the hard limit.

The training provides a reinforcement machine-learned model. This model is trained to set variables in a manufacturing process. The state is input, and the model outputs the settings. The trained model is stored, such as in a memory of the control system of the manufacturing system. The control system then uses the stored model to determine settings during the manufacturing process.

In act 12 of FIG. 1, the machine (e.g., controller) applies the state to the reinforcement machine-learned model. The learned model defines an action space. The learned policy of the model provides an action or actions for each iteration of manufacturing operation or scan time. The action may change some aspect of the manufacturing, resulting in a different state. This different state is input to the model for the model to output another setting for the same or different variable. The machine-learned policy controls the setting evolution over time. The policy provides decision making for creating a sequence of acts in how to set given the feedback of the state of the manufacturing system.

The setting is a change in value or an absolute value output by the reinforcement machine-learned network in response to input of the state. The action is a selected setting from among available settings and/or an amount of change in a setting from among available amounts of change. In response to input of the state (e.g., current values of manipulated variables, controlled variables, set points, and/or sensor measurements), the setting is output. The action is selected from a look-up table. Q-learning uses a look up table to historize the rewards for a given action policy. This look up table is then used to determine the maximum reward given the current state. A neural network may be used to replace the look up table. The look-up table or neural network define a learned policy of the reinforcement machine-learned network. The action policy is selected based on the state and output to the manipulated variables. The action policy is set for manipulated variables, which are discretized with respect to time.

In application to output a setting for on-going manufacturing process, the machine-learned network incorporates the constraints. The reward function during learning is used to constrain or limit actions that are selected during application of the learned model or action policy. The amount of change may be suppressed as a soft bound. An operational or safety limit of a valve, actuator, motor, or other device may be incorporated so that the application to select an action avoids violation of the constraints. The amount of change, maximum, minimum, and/or another hard limit may be used. Deviation from a trajectory may be used in learning so that the selected actions during application avoid or limit deviation from the trajectory.

In act 18, the controller controls the manufacturing process based on the setting or settings. The manufacturing plant is operated with the manipulated and/or control variable of the manufacturing process as set. Over time, different states of the manufacturing process are used to determine the appropriate action or actions. The variables are set according to the learned action policy. The devices of the manufacturing plant are controlled and operate based on the settings. The controller operates to provide the settings using the machine-learned action policy.

Due to incorporation of the constraint or constraints in the reward function of the reinforcement learning, operational or safety-based concerns of the manufacturing process are reduced. The learned action policy is unlikely to use settings that exceed constraints. The learned action policy may completely avoid settings exceeding hard constraints. The reinforcement learning may avoid months or years of engineering labor trying to model a non-linear manufacturing process.

FIG. 3 shows one embodiment of a control system for manufacturing process control. The control system is for application of the machine-learned model but may alternatively or additionally be used for training with reinforcement machine learning. Using deep learning, features determinative of actions to take are learned. Using constrained reinforcement learning, a policy for actions to control a manufacturing process through control of devices of the plant is learned. The resulting constrained reinforcement machine-learned model is used to output settings for manufacturing.

The system implements the method of FIG. 1 and/or the method of FIG. 2. Other methods or acts may be implemented, such as acts for configuring the manufacturing process.

The control system includes a controller 30 for controlling manufacturing by the plant 35. Additional, different, or fewer components may be provided. For example, multiple plants 35 and/or multiple controllers 30 are provided. A user interface (e.g., user input device) may be provided for interacting with the controller 30 and/or plant 35, such as to manually configure or change the manufacturing process.

The plant 35 is a chemical plant, assembly plant, mold or forming plant, baking, or other manufacturing plant. The plant 35 is in one room or building. Alternatively, the plant 35 is distributed in multiple buildings of a facility or over different regions.

The plant 35 includes one or more devices 37 and sensors 36. Additional, different, or fewer components may be provided. For example, storage facilities, local controllers, and/or shipping is provided. As another example, sensors 36 are not used, such as where the settings for the devices 37 represent the state without separate sensing.

The devices 37 are actuators, motors, servos, pumps, valves, mixers, boilers, ovens, conveyors, robots, drill presses, cutting tools, mold tools, joiners, lathes, and/or any other device used in manufacture. The devices 37 are controllable by the controller 30. For example, one or more input signals are used to establish operation of a given device, such as a speed of a mixer. A single control signal may be used. Alternatively, multiple different control signals are used simultaneously or in sequence to control a given device 37.

The devices 37 respond to settings for manipulated variables. For example, a pulse width modulation signal is used to control a motor speed. The setting is of the modulation of the signal. The devices 37 operate based on the setting of the manipulated variables to meet values for controlled variables. For example, a mixer is controlled to spin a paddle at a controlled speed.

The devices 37 may have limited capabilities, such as limits on maximum and/or minimum and/or limit on rate of change. The devices 37 may be limited due to safety concerns, such as requiring manual depressing of a safety switch to operate. These constraints to the manufacturing for any given device 37 or combinations of devices 37 are accounted for in controlling the plant 35.

The sensors 36 are temperature sensors, strain gauges, pressure sensors, humidity sensors, infrared sensors, optical sensors, vision sensors, position sensors, speed sensors, flow sensors, density sensors, chemical sensors, and/or other sensors. The sensors 36 sense one or more aspects of the state of operation of the manufacturing plant 35. The sensors 36 may sense characteristics of a device 37, such as sensing speed of the paddle. The sensors 36 may sense a characteristic separate from the manipulated and/or controlled variables, such as sensing a flow rate in a pipe, temperature of a device, and/or characteristic of the operating environment. The sensors 36 may sense a characteristic of the object, fluid, or gas being manufactured.

The sensors 36 output to or may be read by the controller 30. The state of the manufacturing plant 35 is determined based on the control signals to the devices 37, set points of controlled variables, and/or sensor signals.

The controller 30 is a processor, such as a control system, panel, programmable logic controller, workstation, computer, and/or server. The controller 30 interacts with the plant 35, such as receiving signals from and/or sending signals to the sensors 36 and/or devices 37. The controller 30 determines the state of the plant 35 based on the interaction.

The controller 30 includes a memory 31 storing a reinforcement machine-learned network 32. The controller 30 inputs the state to the stored network 32. The controller 30 determines one or more settings for the devices 37 from an output of the network. With time discretization, the state at any given time is used to determine an action (e.g., a different setting, change in setting, or maintaining a current setting). Control signals are output to the devices 37 for the determined setting. In a next time step, the state is determined, and any settings are output based on the state using the network 32.

The controller 32 is configured to determine a change in a device 37 from a reinforcement machine-learned action policy based on the state. The reinforcement machine-learned action policy was trained using rewards based in part on a limitation of the device 37. For example, the limitation is an amount of change, a reward weight for the amount of change, a minimum, or maximum. As another example, the limitation is a reward weight for a trajectory. Soft or hard constraints may have been used. By using the constraints related to operation of the plant 35 and/or devices 37, the learned policy avoids violation and/or limits deviation in selecting actions. As a result, the control of the plant 35 based on the reinforcement learning may be used in manufacturing without months or years of manually programmed modeling.

The memory 31 or other memory is alternatively or additionally a non-transitory computer readable storage medium storing data representing instructions executable by the controller 30 for learning or applying the machine-learned model 32. The instructions for implementing the processes, methods, and/or techniques discussed herein are provided on non-transitory computer-readable storage media or memories, such as a cache, buffer, RAM, removable media, hard drive, or other computer readable storage media. Non-transitory computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone, or in combination. Likewise, processing strategies may include multiprocessing, multitasking, parallel processing, and the like.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for manufacturing process control with a controller, the method comprising:
   determining a state of the manufacturing process of a manufacturing plant;
   setting a manipulated variable of a controlled device of the manufacturing process, the setting being based on an action output by a reinforcement machine-learned network in response to input of the state;
   incorporating a constraint of the manufacturing process in the reinforcement machine learned network for addressing a safety and/or operational limitation of a component of the manufacturing plant; and
   operating the manufacturing plant with the manipulated variable of the manufacturing process as set,
   wherein the reinforcement machine learned network is subject to a learning process by selecting action in response to the state to maximize a reward function, adding a noise according to a learning rate, and executing a noise adjusted action, wherein the constraint is applied to limit the noise adjusted action.

2. The method of claim 1 wherein determining the state comprises determining a current value of the manipulated variable, a set point for a controlled variable responsive to the current value of the manipulated variable, and a current value of the controlled variable, and wherein setting comprises setting in response to input of the current values of the manipulated and controlled variables and the set point.

3. The method of claim 1 wherein setting comprises setting the manipulated variable based on the action output according to a learned policy of the reinforcement machine-learned network.

4. The method of claim 1 wherein setting comprises setting based on an action policy learned by the reinforcement machine-learned network, the action policy comprising a look-up table or a neural network.

5. The method of claim 1 wherein the constraint incorporated into the reinforcement machine-learned network further configures the reward function to constrain a change based on an amount of change in the setting.

6. The method of claim 1 wherein the constraint incorporated into the reinforcement machine-learned network comprises a limit on an amount of change of the setting of the manipulated variable.

7. The method of claim 1 wherein the constraint incorporated into the reinforcement machine-learned network comprises a maximum, a minimum, or both of the setting of the manipulated variable.

8. The method of claim 1 wherein the constraint incorporated into the reinforcement machine-learned network comprises a maximum, a minimum, or both of a value of a controlled variable responsive to the setting of the manipulated variable in the manufacturing process.

9. The method of claim 1 wherein the constraint incorporated into the reinforcement machine-learned network comprises an operational limitation of a valve, actuator, or motor.

10. The method of claim 1 wherein the constraint incorporated into the reinforcement machine-learned network further configures the reward function to reward based on a reference trajectory.

11. The method of claim 1 wherein setting comprises setting by the controller.

12. A method for reinforcement learning in a manufacturing system, the method comprising:
    machine learning closed-loop control of the manufacturing system with reinforcement learning, the reinforcement learning optimizing a reward or cost function, by:
       in a first stage, explicitly solving an optimization problem to determine an action policy that satisfies one or more constraints including step-bound and/or hard limit constraints, and
       in a second stage, adding a stochastic excitation to the action policy and observing a resulting state, and using the action policy and resulting state to calculate the reward or cost function; and
    storing a machine-learned network from the machine learning for a control system of the manufacturing system.

13. The method of claim 12 wherein satisfying the one or more constraints comprises subjecting to a limit on an amount of change.

14. The method of claim 12 wherein satisfying the one or more constraints comprises subjecting a control variable of the manufacturing system to a maximum, minimum, or both.

15. The method of claim 12 wherein satisfying the one or more constraints comprises subjecting a set point variable of the manufacturing system to a maximum, minimum, or both.

16. The method of claim 12 wherein the machine learning occurs during manufacturing by the manufacturing system.

17. The method of claim 12 wherein the optimizing uses a constrained optimization solver.

\* \* \* \* \*